United States Patent [19]

Gerlach

[11] Patent Number: 4,910,601

[45] Date of Patent: Mar. 20, 1990

[54] DIGITIZING SCANNING APPARATUS

[75] Inventor: Richard K. Gerlach, Rolling Hills Estates, Calif.

[73] Assignee: Truvel Corporation, Torrance, Calif.

[21] Appl. No.: 94,398

[22] Filed: Sep. 8, 1987

[51] Int. Cl.⁴ .............................................. H04N 1/04
[52] U.S. Cl. ..................................... 358/474; 358/474
[58] Field of Search .............. 358/285, 293, 292, 229, 358/93, 101, 106, 107, 108, 903; 378/146, 196, 197; 248/657; 901/15, 16; 364/513

[56] References Cited

U.S. PATENT DOCUMENTS

| | | | |
|---|---|---|---|
| 3,967,242 | 6/1976 | Isoo et al. | 901/15 |
| 4,292,672 | 9/1981 | Southgate | 358/106 |
| 4,402,053 | 8/1983 | Kelly et al. | 358/903 |
| 4,574,318 | 3/1986 | Doyton et al. | 358/285 |
| 4,737,857 | 4/1988 | Rucci et al. | 358/293 |

FOREIGN PATENT DOCUMENTS 2098577 11/1982 United Kingdom ................. 901/16

*Primary Examiner*—James J. Groody
*Assistant Examiner*—David E. Harvey
*Attorney, Agent, or Firm*—Robert J. Schaap

[57] ABSTRACT

A digitizing scanning apparatus for scanning and recording an image in digital format for ultimate reproduction. The apparatus comprises a base and an upstanding tower structure. At least one scanning element, such as a charged coupled device, is carried by an outwardly extending arm on the upstanding tower structure. A source of light is carried by another outwardly extending arm on the upstanding tower structure and is moveable with the scanning element so that there is a constant field of light on any portion of an image as it is being scanned. The apparatus utilizes a pair of horizontal support rods with a unique bearing structure such that a carriage which enables movement of the tower structure is essentially self-aligning and properly supported with a minimum amount of frictional effects. Moreover, the tower structure is removable from and connected to the base housing by merely inserting a neck of the tower structure into a pocket associated with the base housing. A unique circuit board arrangement is located within the tower and is capable of being automatically connected to contacts in the housing when the tower structure is inserted into the pocket. This enables easy and very rapid disassembly of the apparatus for purposes of storage and transport.

32 Claims, 7 Drawing Sheets

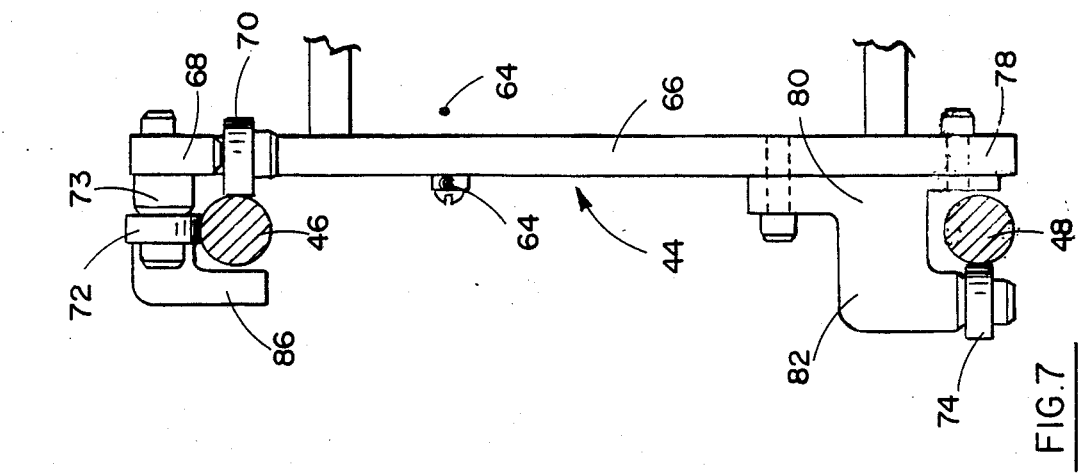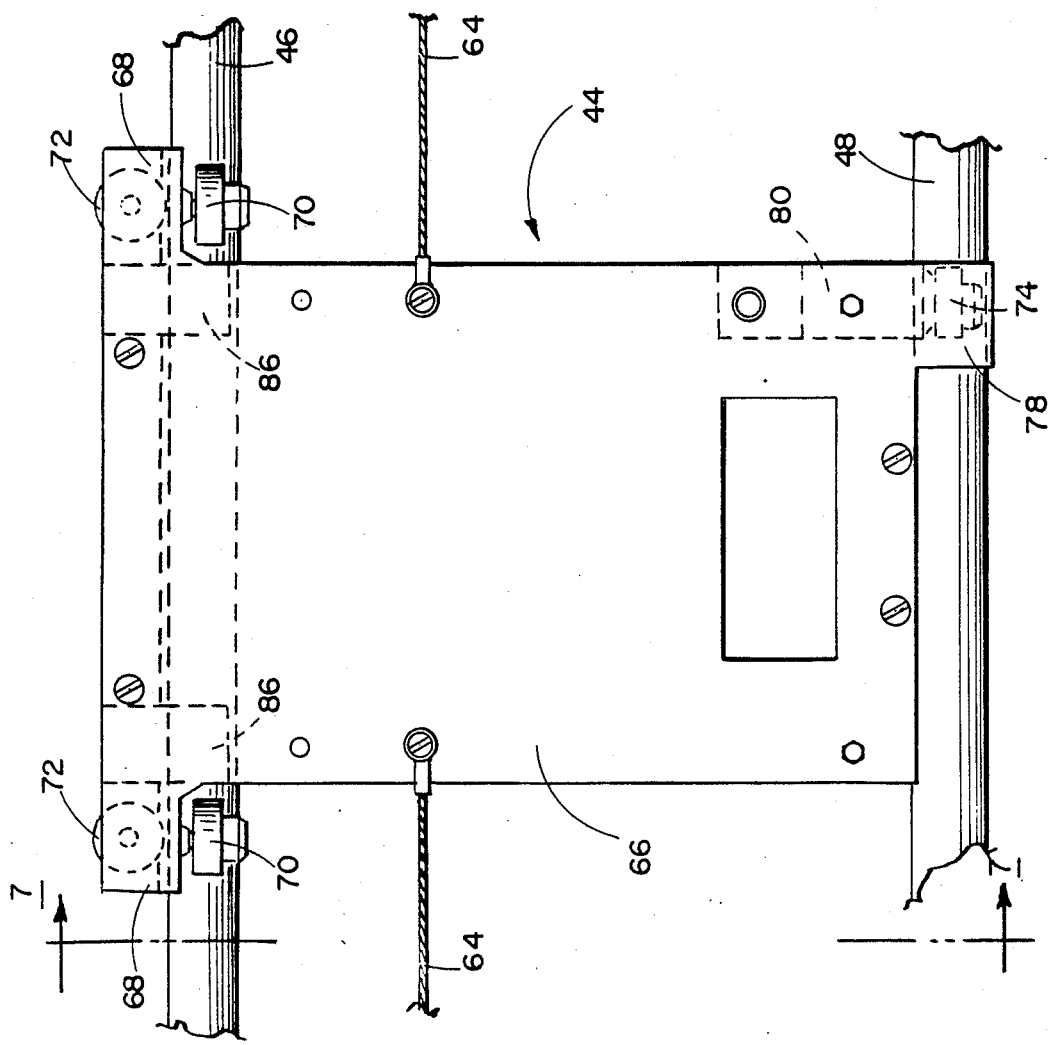

DIGITIZING SCANNING APPARATUS

BACKGROUND OF THE INVENTION

1. Field of the Invention.

This invention relates in general to certain new and useful improvements in digitizing scanning apparatus, and more particularly, to an improved digitizing scanning apparatus which is of a simplified construction and is highly efficient in the actual scanning operation.

2. Brief Description of the Prior Art.

In recent years, there has been an increased interest in digital scanning apparatus for purposes of document control and document storage. Most digital scanners utilize movement of a scanning element with respect to a plate on which an image to be copied is located. Relative movement exists between the plate which holds the image and the scanning element. Electrical signals generated by the scanning element are then stored in a computer storage for re-generation of the original image.

Electronic digitizing scanners are still in their relative infancy in the electronics industry and the presently available digitizing scanners are somewhat rudimentary and overly complex in their construction an in their operation.

Essentially all of the commercially available digitizing scanners utilize a flood light as a means for illuminating the object to be scanned. Even when a plurality of floodlights are employed, there are localized hot spots with uneven light distribution. As a result, the uneven lighting materially interferes with the scanning operation and with the information which is generated in the scanning process. Moreover, these prior art devices utilize an excess of light output in order to attempt to compensate for the uneven light distribution. As a result, excessive electrical wattage was required, and furthermore, the apparatus had to have some means to dissipate the substantial heat generation from the light sources.

In addition to the foregoing, the various prior art digitizing scanning apparatus are somewhat complex in their construction. These apparatus utilize a plate, such as a glass plate, with the image to be copied having the face portion thereof disposed downwardly on a glass sheet, as for example, in the nature of a photocopier. Thereafter, a scanning element moved across the image from beneath the surface of the image. One of the primary problems with this type of scanning mechanism is the fact that the support rails which carry the moving scanner are deeply embedded in the body of the apparatus. In addition, a very complex bearing structure is required to properly support the scanning head in its movement across the image. Further, the carriage which moves the scanning head is required to be precisely aligned. This, in turn, requires precisely aligned bearings and support rods. In addition, this necessity of precisely aligned components materially interferes with and limits the potential scanning speed which could be obtained.

OBJECTS OF THE INVENTION

It is, therefore, one of the primary objects of the present invention to provide a digitizing scanning apparatus which utilizes a source of light moveable with a scanning head and with respect to an image to be scanned and which thereby overcomes problems of uneven light distribution during the scanning operation.

It is another object of the present invention to provide a digitizing scanning apparatus of the type stated which comprises a tower structure capable of extending upwardly above and over a base housing which carries an image to be scanned and which tower structure is provided with both a source of light and a scanning element operating in conjunction with one another for movement relative to the image being scanned.

It is a further object of the present invention to provide a digitizing scanning apparatus of the type stated having a base housing and an upstanding tower structure which carries a source of light and a scanning element in such manner that the scanning element and the source of light may be adjustably positioned with respect to an image to be scanned in order to accommodate images of varying thicknesses.

It is a additional object of the present invention to provide a digitizing scanning apparatus of the type stated in which a tower structure carrying a scanning element and a source of light may be easily and rapidly disconnected from a base housing for purposes of storage and transport and reconnected to of manually making electrical connections.

It is another salient object of the present invention to provide a digitizing scanning apparatus of the type stated in which a unique carriage mechanism and bearing arrangement is provided for supporting an upstanding tower structure with respect to a base housing.

It is still another object of the present invention t provide a digitizing scanning apparatus of the type stated in which an upstanding tower structure is supported by a carriage structure shiftably supported on a plurality of rails located at a generally vertically disposed wall of base housing during scanning movements with relatively low frictional interference.

It is yet another object of the present invention t provide a digitizing scanning apparatus of the type stated which can be constructed at a relatively low cost and which is highly efficient in operation.

With the above and other objects in view, my invention resides in the novel features of form, construction, arrangement and combination of parts presently described and pointed out in the claims.

BRIEF SUMMARY OF THE INVENTION

In general terms, the present invention relates to a digitizing scanning apparatus for scanning and recording an image for ultimate reproduction. The scanning apparatus comprises a base housing along with an upstanding tower structure operatively mounted on the base housing for scanning movement with respect thereto.

The base housing is provided with a relatively flat upper surface which constitutes a platform, or so-called "platen" for receiving the image to be scanned. Means is provided in the base housing for moving the tower structure relative to the image in order to enable the scanning movement with respect to the image on the platform. This structure includes a carriage moveable along a pair of horizontally disposed support rails, as hereinafter described.

A scanning element is operatively carried by the upstanding tower structure and is capable of scanning the image on the platen of the housing when relative movement occurs between the tower structure and the housing. Preferably, the scanning element is a charged coupled device. In addition, a source of light is also operatively carried by the tower structure in relatively close proximity to the scanning element to enable an illumination of the image on the platen with substantially even light distribution across the image as the scanning action takes place.

The tower structure is preferably comprised of a first arm which extends outwardly therefrom and over the platen of the housing. A scanning element is carried by this first arm. At least one second arm is operatively secured to the tower structure and extends outwardly therefrom over the platen o the housing and carries a source of light. In still a more preferred embodiment, a pair of spaced apart arms extend outwardly from the tower structure and each of which carries a source of light. The first arm which carries the scanning element is located above but in non-interfering relationship to the pair of second arms which carry the sources of light.

In another embodiment of the invention, a mounting casing is mounted on the base housing and is secured to and moveable with the carriage for carrying the tower structure in a scanning movement relative to the base housing. The tower structure has an elongate neck portion which is adapted to extend into an upwardly facing opening in the mounting casing. In this way, the tower structure can be raised and lowered relative to the object (image) to the scanned. Moreover, the entire tower structure may be disconnected and removed from the mounting casing and hence the base housing for storage and transport and easily reconnected thereto.

In a more preferred embodiment, a circuit member is carried by the tower structure in the neck of the tower structure. This circuit member may adopt the form of a circuit board and would contain the electronics necessary to cooperate with any of the electronics located in the base housing. The circuit board is provided with a connector section at its lower end and which is adapted to be received by and become connected to a base strip or so-called "connector strip" mounted in the casing. Thus, when the tower structure is inserted into the opening of the casing, the circuit board will be automatically connected with the connector strip without any need for manual intervention. Moreover, when the tower structure is removed from the mounting casing, there will be an automatic disconnection between the circuit board and the connector strip, again without any need for manual intervention.

The circuit board is mounted for limited vertically shiftable movement within the tower structure. In this way the circuit board will move upwardly relative to the tower structure when the latter is initially inserted into the opening in the casing until the circuit board is fully connected to the base connector strip. In like manner, the circuit board will move downwardly relative to the tower structure as the latter is moved upwardly and outwardly from the opening in the casing until the circuit board is fully disconnected from the base connector strip.

The carriage, and hence the tower structure, is mounted on the pair of generally horizontally extending vertically spaced apart support rails. These rails are preferably located at the rear portion of the base housing. These rails ar also located close to the surface of the rear wall of the base housing and are accessible by a pair of elongate openings in the rear wall of the housing. The tower structure is operatively mounted on these support rails for movement therealong relative to the platen on the housing. A projecting means in the form of a plurality of arms extend inwardly from the carriage to engage these support rails and thereby support the tower structure.

A unique bearing arrangement is provided for supporting the tower structure o the pair of horizontally disposed support rails during its longitudinal shifting movement, that is, its scanning movement back and forth with respect to the base housing. A first pair of spaced apart bearings is located to engage the upper support rail on a side thereof, namely, a rearwardly facing side thereof. A second pair of spaced apart bearings is located to engage another portion of the upper rail on the upper surface thereof. A third bearing is located at the lower portion of the carriage and is also located to engage the lower rail on the forwardly facing surface thereof. This unique bearing arrangement enables precise engagement of the bearings, requiring no adjustment, and movement of the carriage longitudinally with a minimum of frictional effects.

From the foregoing, it can be observed that there are many advantages and unique constructions which are afforded by the digitizing scanning apparatus of the present invention. A non-limiting list of some of these unique advantages and features include:

1. A tower structure which is moveable relative to a base housing and which carries both a source of light and a scanning element such that there is a constant field of illumination and constant light characteristics in the scanned area, as well as concentrated light across the particular area being scanned.

2. The use of a very low wattage light source comprised of a plurality of fluorescent lamps which move with the tower structure in coordinated relationship to the scanning element.

3. A tower structure which is capable of being inserted into an opening associated with the base housing and removed from that opening without the need for manual intervention to provide or maintain any electrical connection between the tower structure and the base housing inasmuch a electrical components of the tower structure and the base housing are automatically connected and disconnected with the insertion and removal of the tower structure.

4. A tower structure which is capable of being vertically positioned relative to the base housing, again without the need to intervene manually to maintain electrical connection between electrical components in the bas housing and in the tower structure.

5. A tower structure which is vertically shiftable in order to accommodate images of differing depths on the platen such that scanning may occur with a simple flat sheet or with a large box-like structure or the like.

6. A unique rail supporting system for supporting a tower structure in a longitudinal scanning movement. This rail support system is located adjacent the back wall of the base housing and is readily accessible, not only for easy repair and maintenance, but also for easy connection of the tower structure thereto. In addition, this positioning of the rail system avoids an otherwise overly complex construction for supporting the tower structure if the rails were located elsewhere, such as for example, in the base housing.

7. A unique bearing arrangement which automatically self-aligns on the rails for supporting the tower structure. This simplifies the construction and reduces the overall cost of the apparatus, and moreover, provides for a relatively friction-free scanning movement of the tower structure relative to the base housing.

8. A unique zoom lens arrangement and associated structure which allow for scanning documents of different aspect ratio and for changing the aspect ratios of the document itself.

It should be understood that the above list of unique advantages and features is non-limiting and has been set forth herein for purposes of illustrating some of the unique aspects of the present invention.

This invention possesses many other advantages and has other purposes which may be made more clearly apparent from a consideration of the forms in which it may be embodied. These forms are shown in the drawings forming a part of and accompanying the present specification. They will now be described in detail for the purposes of illustrating the general principles of the invention, but it is to be understood that such detailed description is not to be taken in a limiting sense.

BRIEF DESCRIPTION OF THE DRAWINGS

Figure 1:
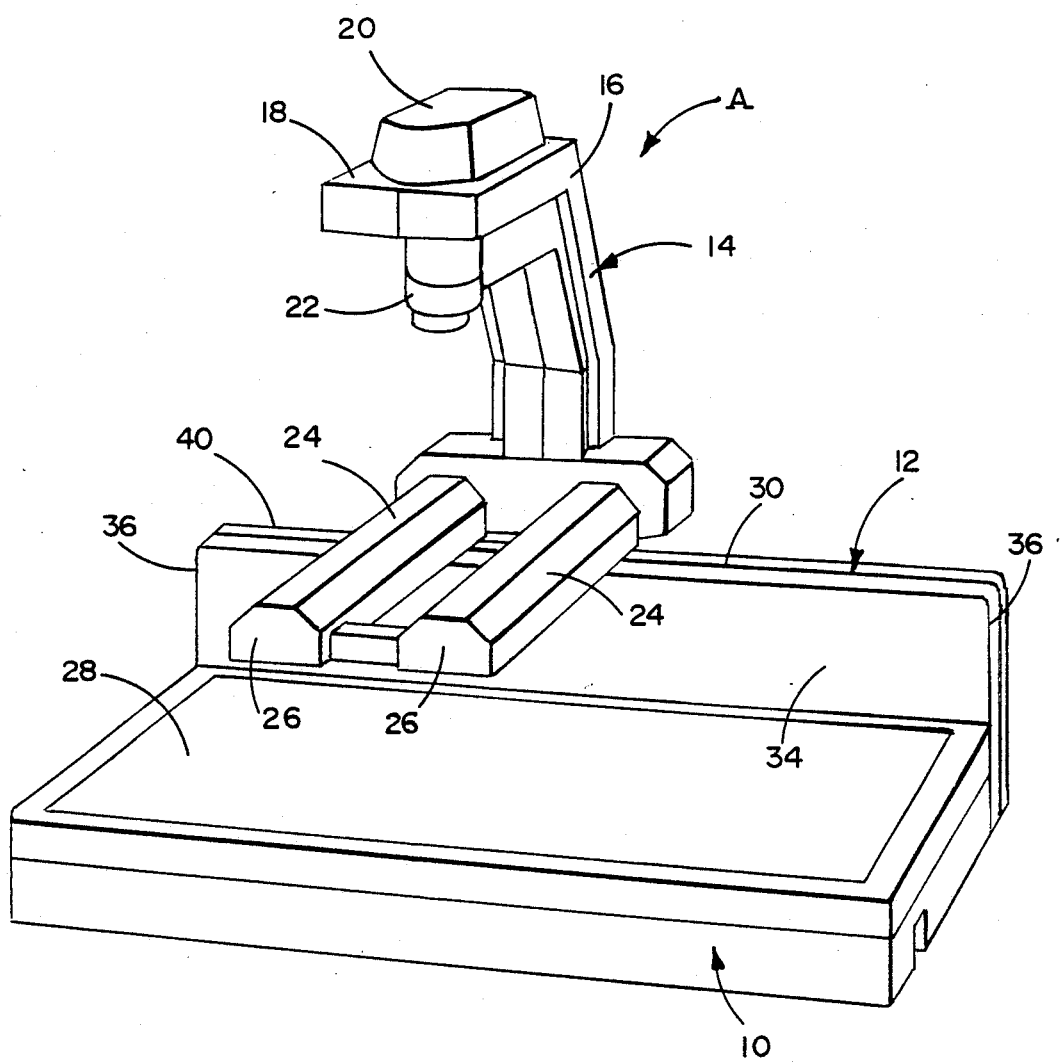
Figure 2:
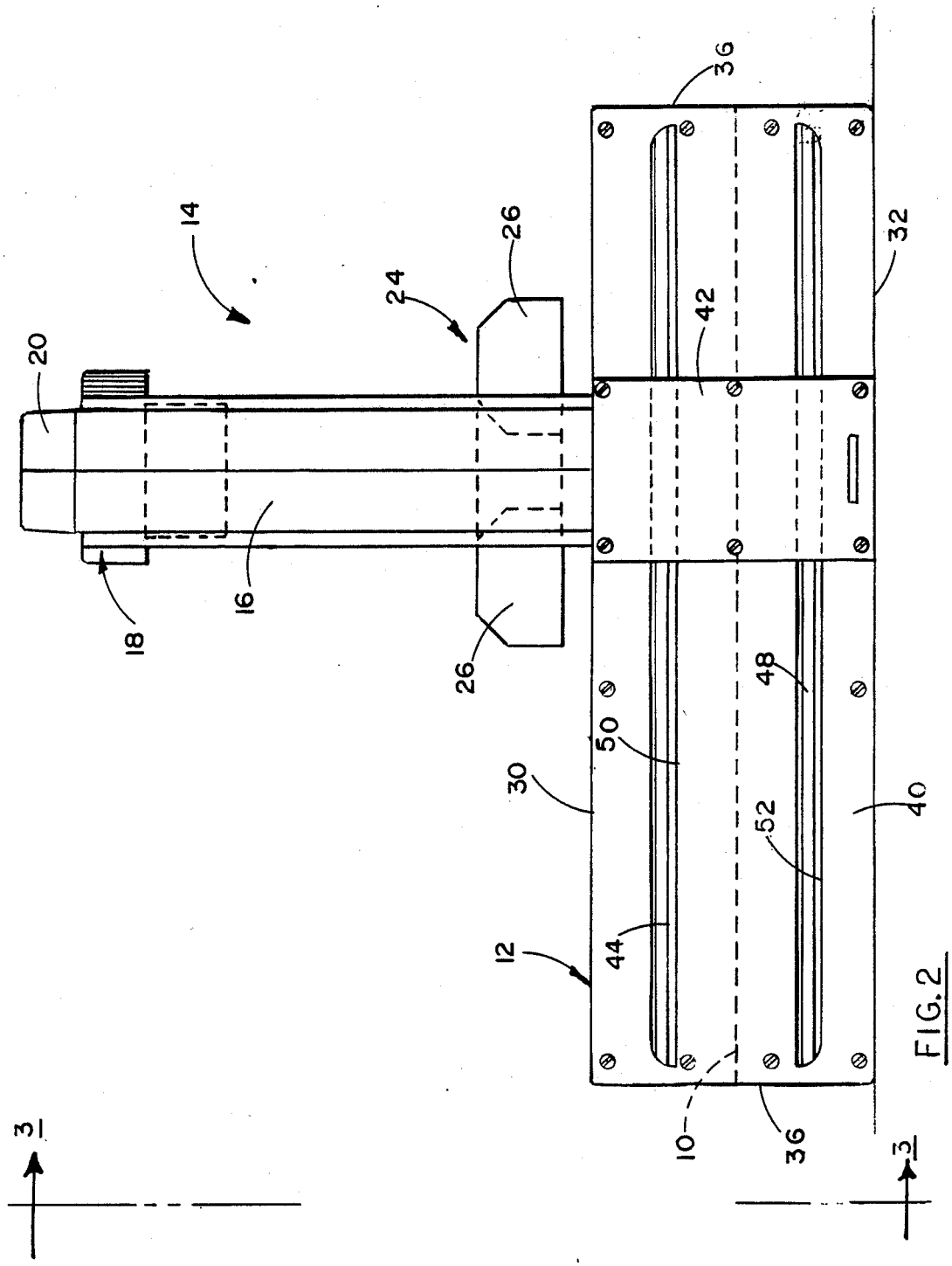
Figure 3:
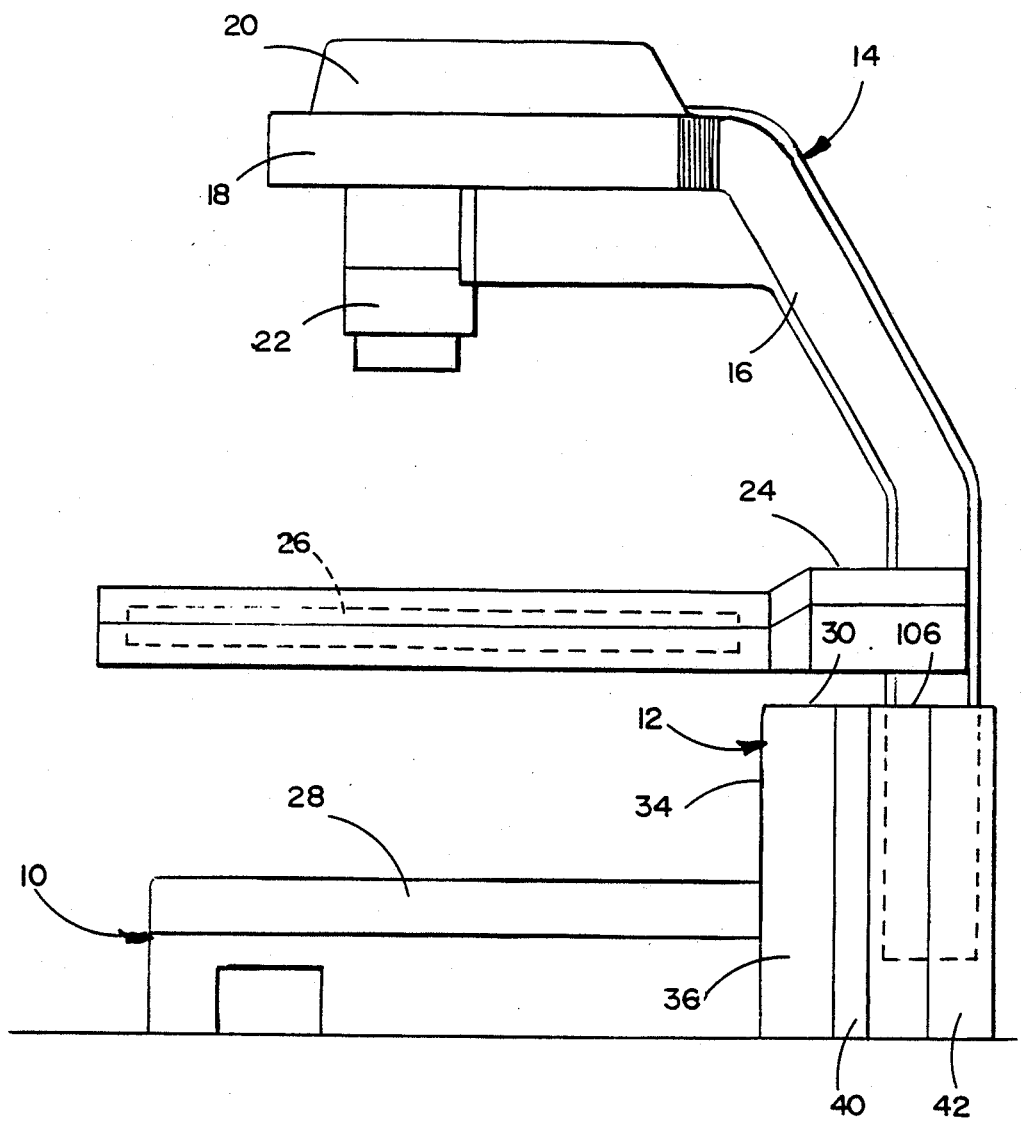
Figure 4:
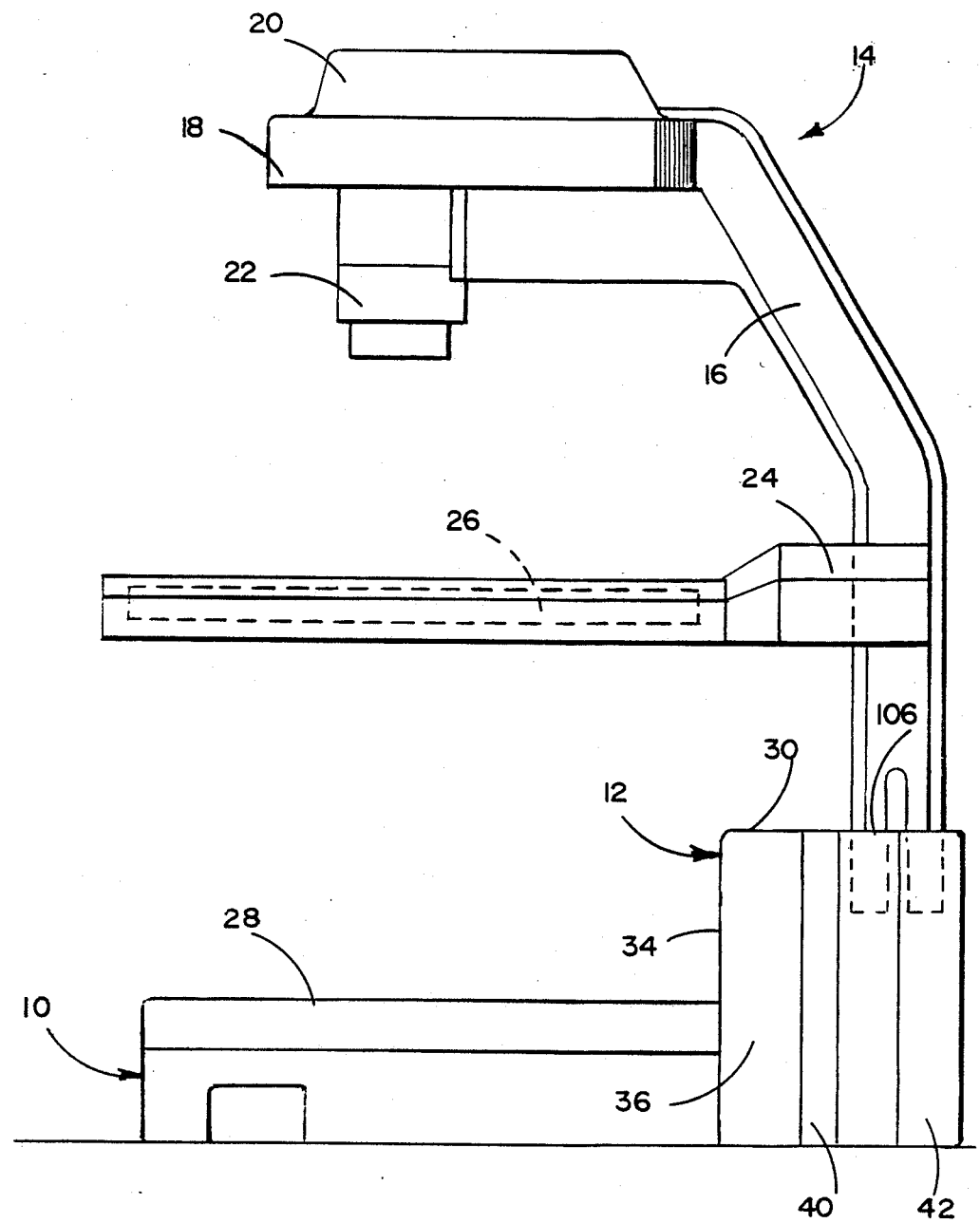
Figure 5:
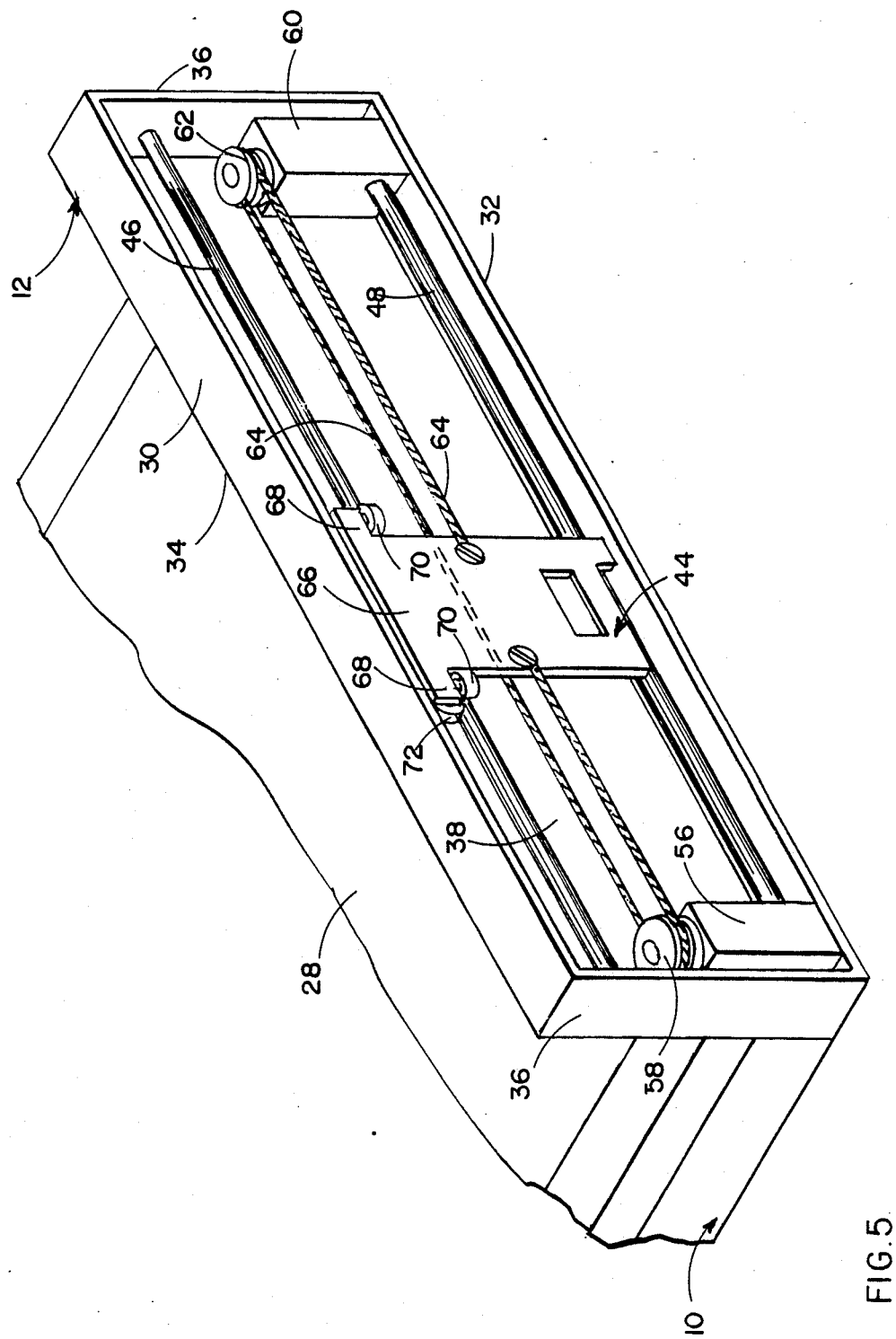
Figure 8:
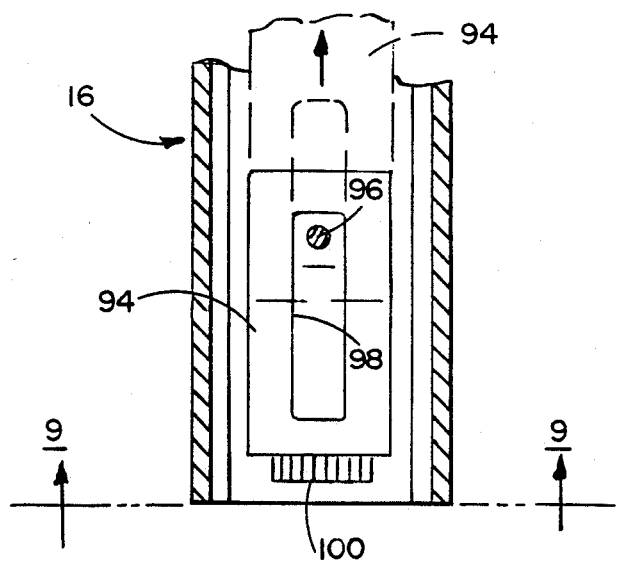
Figure 9:
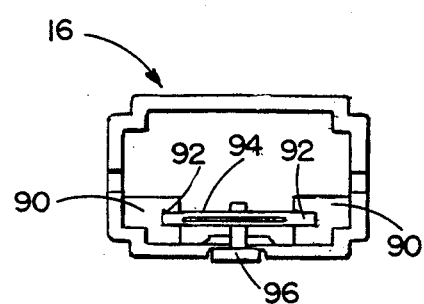
Figure 11:
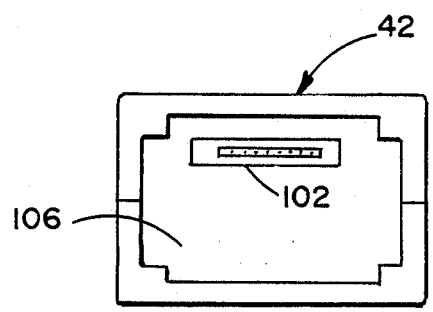
Figure 10:
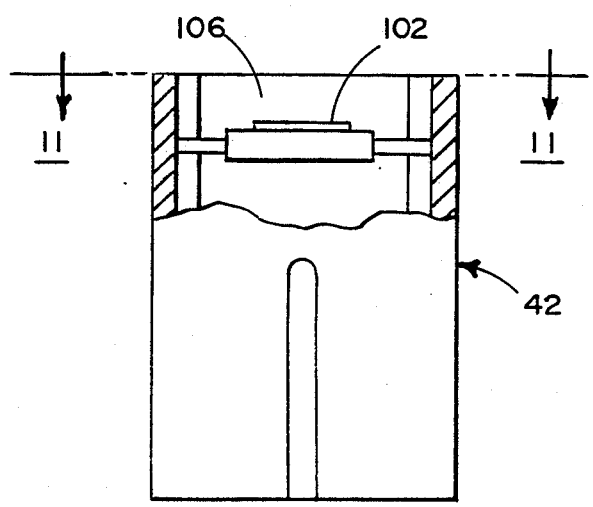

Having thus described the invention in general terms, reference will now be made to the accompanying drawings (seven sheets) in which:

FIG. 1 is a perspective view of a digitizing scanning apparatus constructed in accordance with and embodying the present invention;

FIG. 2 is a rear elevational view of the digitizing scanning apparatus of FIG. 1;

FIG. 3 is an end elevational view of the digitizing scanning apparatus of FIGS. 1 and 2;

FIG. 4 is an end elevational view of the digitizing scanning apparatus, somewhat similar to FIG. 3, and showing the tower structure in an extended position relative to the base housing forming part of the scanning apparatus;

FIG. 5 is a fragmentary perspective view showing a rear portion of the digitizing scanning apparatus constructed in accordance with and embodying the present invention with the rear cover plate removed for illustrating movement of the carriage along the pair of support rails;

FIG. 6 is a rear elevational view of a portion of the carriage and associated means for mounting same on a pair of support rails forming part of the digitizing scanning apparatus of the present invention;

FIG. 7 is a vertical sectional view taken along line 7—7 of FIG. 6 and showing the bearing arrangement for mounting the carriage onto the pair of support rails forming part of the digitizing scanning apparatus of the present invention;

FIG. 8 is a fragmentary vertical sectional view showing the lower neck portion of the tower structure forming part of the digitizing scanning apparatus of the present invention;

FIG. 9 is a horizontal sectional view taken along line 9—9 of FIG. 8;

FIG. 10 is a side elevational view, partially broken away and in section, of a portion of the casing forming part of the digitizing scanning apparatus of the present invention; and FIG. 11 is a horizontal sectional view taken along line 11—11 of FIG. 10.

DETAILED DESCRIPTION OF A PREFERRED EMBODIMENT

Referring now in more detail and by reference characters to the drawings which illustrate a preferred embodiment of the present invention, A designates a digitizing scanning apparatus comprising a base housing 10 and an upstanding drive housing 12. The base housing 10 is generally of a rectangular construction and includes on the interior portion thereof, some of the electronic components (not shown) necessary for the operation of the digitizing scanning apparatus A. The drive housing 12 is also provided for supporting and enabling a longitudinal scanning movement of a tower structure 14 in a manner to be hereinafter described in more detail.

The tower structure 14 includes a vertically disposed neck section 16 and an upwardly and forwardly projecting first arm 18, in the manner as best illustrated in FIGS. 1-3 of the drawings. The arm 18 carries a scanning element 20 for scanning an image and for generating electrical signals in response thereto. The arm 18 also carries a lens 22 for proper focusing of the image.

Also mounted on the tower structure 14 are a pair of outwardly extending second arms 24 which are both designed to carry sources of light 26. In this case, the sources of light may preferably adopt the form of fluorescent light tubes. Preferably, each arm carries a pair of fluorescent light tubes.

By further reference to FIGS. 1 and 2, it can be observed that the arm 18 is located in a horizontal plane approximately mid-way between each of the pair of forwardly extending arms 24, although it is located vertically spaced above the arms 24. In this way, as the arms 24 illuminate an image disposed on the base housing 10, the scanning element 20 through the lens 22 will scan the image. Moreover, inasmuch as there is always constant movement of the source of light with respect to the scanning element 20, there will be a uniform distribution of light on each portion of the image being scanned.

The present invention has thereby obviated the problem of localized hot-spots and uneven light distribution which has existed in each of the prior art digitizing scanning apparatus. This type of source lighting completely eliminates the problem of inefficient flood lighting which was previously employed by digitizing scanning apparatus. Moreover, there is an intense illumination of the image to be scanned, that is the light is concentrated and maximized essentially in scanning areas only.

While the lighting system generally provides even lighting distribution in the region of the scan, localized hot spots may exist in the light source. However, it is not necessary to eliminate any localized hot spots in the lamps employed inasmuch as the system may calibrate itself for such hot spots. In any localized hot spot in the lamp, that hot spot will effectively travel the length of the scan, thereby forming a line of localized hot spots in the direction of the scan. The apparatus can automatically calibrate to compensate for these lines of localized hot spots since they will essentially remain the same throughout the scan.

Inasmuch as the lights are only required to be sufficient to illuminate the area to be scanned, relatively low wattage lamps may be employed. In this respect, each of the pair of arms 24 may carry two individual, side by side, fluorescent lamps so that a total of four lamps may be employed. In addition, with the four lamps, the digitizing scanning apparatus of the present invention can utilize 20-watt lamps so that only a total of 80 watts of light are required. In contrast, many of the prior art digitizing scanning apparatus of comparable size were required to use as much as 1,000 to 2,000 watts in order to obtain a proper light distribution. Thus, the digitizing scanning apparatus of the present invention does not encounter heat generation and hence, heat dissipation problems.

The scanning element preferably adopts the form of a charged coupled device (CCD), although essentially any known scanning element could be employed. The charged coupled device is preferred inasmuch as it is capable of temporarily storing the electrical signals representative of the image being scanned.

In addition to the foregoing, the present invention utilizes a type of zoom lens 22 and preferably a 28 mm to a 85 mm zoom lens with a 35 mm mount. In this way, it is possible to scan different sized images by only changing the number of pixels per square unit of scanned image, as for example, the number of pixels per square inch. The scanning resolution in the horizontal direction, that is across the width of a document, is determined by the number of elements in a charged coupled device array, as well as the area being scanned. In one of the preferred embodiments of the present invention, the charged coupled device being used has a 3600-element array such that 300 samples per inch are obtained across a 12-inch scanning area. If the lens is zoomed from a 28 mm focal length to an 85 mm focal length, the scanning field can be continuously narrowed to four inches. Thus, the present invention is capable of obtaining a scan density of approximately 900 per inch across a four-inch area, or approximately 450 pixels per inch across and eight-inch area, or approximately 300 pixels per inch across a twelve-inch area.

The resolution of the scan in the vertical direction is determined by the rate at which the scanning element is moved with respect to the image itself. The faster the movement of the scanning element, the lower the resolution of the generated image will be. In like manner, with a slower movement, a higher resolution can be obtained. The horizontal and vertical resolutions are independent of one another. The scanning may occur with a desired number of pixels per inch in the direction of the scan and the scanning may occur with the desired number of lines in a scan.

In accordance with the present invention, it is also possible to read grey levels, that is, the scanning element can read a full eight bits, namely 256 levels of grey for each sample. The apparatus of the invention also allows a half-tone conversion. Thus, the scanning apparatus will digitally convert a continuous tone photograph with the approximate effect of a one hundred ten line half-tone screen with essentially the same scanning rate.

The housing 10 is provided with an upper surface 28 which constitutes a platen for receiving a document, namely the image to be scanned. In this case, the term "image" is used in a broad sense to include pictorial or printed material or the like. Moreover, the term "image" is used in a broad sense to include any type of document or other member which is to be scanned and which is not necessarily limited to material in graphical or printed form. Accordingly, an object itself can be scanned with the digitizing scanning apparatus of the present invention.

The drive housing 12 is generally rectangular in construction and is comprised of a top wall 30, a bottom wall 32, a front wall 34 and which are connected by a pair of spaced apart end walls 36, thereby forming an interior compartment 38. Furthermore, a rearwardly facing removable cover panel 40 is provided for disposition over the rear portion of the drive housing 12.

Mounted on the drive housing 12 is a mounting casing, often referred to as "tower structure support case" 42. This support case 42 is operatively mounted on a carriage 44 in a manner to be hereinafter described in more detail. The tower structure support case 42 is designed to carry the tower structure 14 and receives the lower neck portion 16 of the tower structure, in the manner as illustrated in FIGS. 1-4 of the drawings.

The carriage 44 is supported on a pair of support rails 46 and 48 which are located within the drive housing 12, in the manner as best illustrated in FIGS. 5-7 of the drawings. The support rails 46 and 48 are located adjacent to the interior surface of the rear panel 40 and are exposed to the exterior by means of a pair of horizontally extending vertically spaced apart slots 50 and 52, respectively, in the rear panel 40. The rails 46 and 48 are preferably circularly shaped rods, in the manner as shown in FIGS. 6 and 7 of the drawings.

Mounted within the interior compartment 38 of the drive housing 12 adjacent one of the end walls 36 is an upstanding post 56 which journals a pulley 58 at its upper end. Also mounted within the compartment 38 adjacent to the opposite end wall 36, that is, the right-hand end wall, reference being made to FIG. 5, is an upstanding electric motor 60. Mounted on a drive shaft extending upwardly from the motor 60 is a drive pulley 62. A drive belt 64 is trained around each of the pulleys 58 and 62, and has a pair of opposed ends connected to the carriage 44 in the manner a best illustrated in FIGS. 5 and 6 of the drawings. In this way, when the motor 60 is energized for rotation in one direction, the carriage will move to the right or to the left, and when energized for rotation in the opposite direction, the carriage will move longitudinally in the opposite direction.

The carriage 44 preferably adopts the form of a relatively flat plate 66, as illustrated in FIGS. 5-7 of the drawings. This flat plate 66 is provided with a pair of opposite longitudinally projecting upper end portions 68. The carriage 44 is mounted on the support rails 46 and 48 by a unique bearing arrangement which is more fully illustrated in FIGS. 6 and 7 of the drawings. A first pair of spaced apart bearings 70 are located for rotation about a vertically disposed axis and engage the rearwardly presented side of the rail 46. A second pair of spaced apart roller bearings 72 are journaled in pillow blocks 73 extending inwardly from each of the extended end portions 68, in the manner as illustrated in FIGS. 6 and 7. This second pair of spaced apart bearings, which are preferably roller bearings, are adapted to engage the upper surface of the upper rail 46. Each bearing in the pair of spaced apart bearings 72 is located at the opposite sides of the plate 66, and in like manner, each of the pair of bearings 70 are engaged at the opposite ends of the plate 66.

The plate 66 is provided with a downwardly extending projection 78. Mounted on the inwardly facing surface of the projection 78 of the plate 66 is a bracket 80 having an inwardly extending arm 82. Mounted on the inner end of the arm 82, in the manner as illustrated in FIG. 7, is a third roller bearing 84 which is also journaled for rotation about a vertically disposed axis. It can be observed that the roller bearing 84 engages the lower rail 48 on a side opposite that in which the roller bearing 70 engages the upper rail 46, namely the forwardly facing side.

A pair depending lugs or so-called "keepers" 86 extend forwardly and downwardly over the forwardly presented face of the upper rail 46. These lugs are also spaced apart from one another at opposite ends of the carriage plate 66 and serve to restrain any unauthorized downwardly directed force on the arms 18 and 24 from pushing the lower end of the carriage plate 66 away from the lower rail 48.

This arrangement of the roller bearings for supporting the carriage 44 is highly effective in that it balances the loads imposed on the carriage 44 by the tower structure 14. In this respect, it can be observed that the tower structure mass has a tendency to bias the carriage 44 in a direction where the lower portion would be pulled rearwardly or outwardly and the upper section would be pulled forwardly or inwardly. The roller bearings are thus arranged so that they, in effect, counter-act the forces imposed on the carriage 44 by the tower structure 14. In this way, there is a minimum number of roller bearings and yet, there is a relatively smooth longitudinally shiftable movement of the carriage 44 with a minimum amount of frictional effect.

The use of the bearing arrangement previously described is highly effective in that the bearings are essentially self-aligned on the support rails and requires no alignment or adjustment. Inasmuch as the bearings are located on a single plate, when the plate is assembled on the support rods, the bearings, in effect, become self-aligned. In other words, the bearings will automatically locate themselves in proper alignment with the support rod and hence, the carriage 44 itself will be properly aligned. Thus, it is only necessary to place the carriage on the support rails without the need to manually align the same.

The construction of the carriage 44 being mounted for longitudinal movement adjacent the rear wall of the drive housing 12 on a pair of rails adjacent the rear wall of the drive housing, has been found to be highly effective in that there is no need to support the entire tower structure by rails located within the base housing itself. The provision of the pair of rails which are vertically spaced apart from each other and which extend along the back wall of the base housing simplifies the overall construction of the scanning apparatus, and moreover, provides an effective means for both maintenance and repair of the scanning apparatus inasmuch as the entire drive mechanism is readily accessible and does not require a complete disassembly of the base housing itself. In addition to the foregoing, the carriage, and hence the tower structure, is uniquely mounted with the carriage 44, such that there is a minimal amount of friction and hence, there is little or no interference with the scanning operation.

It can be realized that if there were an substantial friction involved in the shifting movement of the carriage 44, it would interfere with the scanning movement and would give rise to distorted electrical signals and thereby, give rise to errors in the image which is being stored and reproduced. The scanning apparatus of the present invention does not suffer from this limitation. Moreover, this allows for a much faster rate of scanning than was heretofore obtainable with the prior art digitizing scanning apparatus. In fact, the apparatus of the present invention can scan at a rate of 1.4 inches per second and greater which allows a typical 8.5 by 11 inch document to be scanned and completely introduced into electronic signal form in 6.5 seconds (at 300 density pixels per inch with a 256 grey scale level).

In accordance with the above identified construction, it can be observed that the aspect ratio of a document which is to be scanned and recorded can be altered by the user of the apparatus of the present invention. Thus, it is possible to scan a document the size of 8.5 by 14 inches and condense the same into a re-printed document of 8.5 by 11 inches without loosing any detail whatsoever. Moreover, inasmuch as some type of auxiliary equipment, such as computer printers or the like, may operate with a different aspect ratio, it is possible for the user of the scanning apparatus to adjust the aspect ratio to accommodate such auxiliary equipment.

The construction of the neck 16 forming part of the tower structure 14 is more fully illustrated in FIGS. 8 and 9 of the drawings. In this case, it can be observed that the neck is somewhat rectangular in horizontal cross-section and includes a pair of opposed bosses 90 located adjacent one of the walls thereof and which are provided with opposed aligned slots 92 for receiving a circuit board 94. The circuit board 94 carries the electronic components and circuitry from the scanning element 20 and also the electrical components necessary for operation of the lights 26. The circuit board 94 is vertically shiftable within the opposed slots 92 and for this purpose, a pin or bolt 96 projects inwardly from one of the side walls of the neck 16 and into an elongate vertically disposed slot 98 formed in the circuit board 94. In this case, it can be observed that the circuit board 94 is located in its lower position, as illustrated in FIG. 8, when the pin or bolt 96 engages the upper end of the slot 98. In like manner, the circuit board 94 would be located in its uppermost position when the bolt 96 locates the lower end of the elongate slot 98, as shown in the phantom lines of FIG. 8.

The circuit board 94 is provided with a connecting strip section 100 at its lower end and which is adapted for mating engagement with a connector strip 102 mounted within the mounting casing 42. The connector strip 102 is fixedly located within the casing 42 and would be connected to any other electronic components in the base housing 10 by means of electrical current carrying conductors (not shown).

The connecting strip section 100 on the lower end of the circuit board 94 is adapted to engage and become automatically connected to the connector strip 102 by a snap-fitting type engagement. Thus, when the neck section 16 is inserted into an opening or pocket 106 in the upper end of the mounting casing 42, the connecting strip 100 will engage and become automatically connected with the connector strip 102 without the need of any manual intervention. In other words, it is not necessary for a user or operator of the digitizing scanning apparatus to physically connect the connector strip 102 or any other electrical component located within the mounting casing 42 or in the base housing 10.

In addition to be above, this construction of a vertically shiftable circuit board 94 allows the tower structure to be vertically positioned relative to the base housing 10 in order to accommodate different sized images, that is, images having different depths in the vertical dimension. Moreover, inasmuch as the circuit board 94 is shiftable within the slots 92 in the neck section 16, the entire tower structure 14 may be raised and lowered relative to the base housing 10 while still maintaining electrical connection between components of the tower structure and the base housing.

FIGS. 2 and 3 illustrate the tower structure in its lowermost position, that is, the position which would normally be used when scanning a document on the platen and which document is relatively flat, such as a single sheet page. However, FIG. 4 shows the tower structure 14 raised relative to the base housing 10. In this position, pages of a relatively thick book, the top of a box, or like structure, could be scanned. Heretofore, it was virtually impossible to scan images of differing thickness and electronically store information of this type in an of the prior art digitizing scanning apparatus. Moreover, the vertical shifting of the tower structure is quite simple and does not require any manual intervention for the re-positioning of the electronic components, as aforesaid.

The lens 22 could be automatically controlled in the digitizing scanning apparatus so as to adjust its focus when the tower structure 14 is raised or lowered. For this purpose, this digitizing scanning apparatus could be provided with a suitable manually operable control or the refocusing thereof could be controlled automatically.

In can be observed that the entire tower structure may be removed from the base housing itself by merely pulling the neck section 16 out of the upper end 106 of the mounting casing 42. Moreover, there is no need to re-wrap wires and the like. Thus, the tower structure 14 may be stored and the base housing 10 stored separately for purposes of storage and/or transport. In like manner, when re-using the digitizing scanning apparatus, it is only necessary to insert the neck 16 into the opening 106 of the mounting casing 42. It can be observed that the opening 106 is rectangular in shape. In like manner, the neck section 16 of the tower structure 14 is also irregular in shape and has essentially the same cross-sectional shape as the opening 106. In this way, the neck can only be inserted in the opening 106 in a desired and proper orientation. When inserted in the opening 106 in its proper orientation, the electrical components forming part of the tower structure will automatically be connected to the electrical circuitry in the base housing 10.

Thus, there has been illustrated and described a unique and novel digitizing scanning apparatus which includes a light source and scanning element which are moveable together with respect to a image to be scanned and which provides for uniform light distribution across the image and which apparatus also allows for automatic connection of a removable tower structure to a base housing. The apparatus further provides a unique mounting arrangement for the tower structure along with a unique bearing support therefore. Thus, the present invention fulfills all of the objects and advantages which have been sought. It should be understood that many changes, modifications, variations and other uses and applications will become apparent to those skilled in the art after considering this specification and the accompanying drawings. Therefore, any and all such changes, modifications, variations, and other uses and applications which do not depart from the spirit and scope of the invention ar deemed to be covered by the invention.

Having thus described my invention, what I desire to claim and secure by letters patent is:

1. A digitizing scanning apparatus for scanning and recording an image for ultimate reproduction, said apparatus comprising:
   (a) a base housing,
   (b) a pair of support rails mounted on said housing,
   (c) means for mounting an upstanding tower structure on said support rails for providing a longitudinal shifting movement with respect to said rails and to which the tower structure is detachably connected,
   (d) a source of light carried by said tower structure for illuminating an image on said base housing,
   (e) a scanning element mounted on said tower structure for scanning the illuminated image on said base housing,
   (f) said housing including means for receiving the image, and
   (g) means for causing relative movement between said image and said tower structure to enable digitization of said image so that it may be recorded and subsequently reproduced.

2. The digitizing scanning apparatus of claim 1 further characterized in that the means for causing relative movement causes movement between the tower structure and the housing, and said scanning element is mounted on said tower structure and scans the image on said housing when relative movement exists between said tower structure and said housing.

3. The digitizing scanning apparatus of claim 1 further characterized in that said source of light is also mounted on said tower structure to enable illumination of the image on said housing with substantially even light distribution across any portion of said image being scanned as the scanning takes place.

4. The digitizing scanning apparatus of claim 1 further characterized in that at least one first arm is secured to said tower structure and extends outwardly therefrom over said housing and said scanning element is mounted on said first arm and at least one second arm is secured to said tower structure and extends outwardly therefrom over said housing and said source of light is mounted on said second arm.

5. The digitizing scanning apparatus of claim 1 further characterized in that
   (a) a circuit member is in said tower structure and having a connection section at a lower end thereof, and
   (b) said means for mounting including a mounting casing and sized to receive the lower end of said tower structure,
   (c) a connector strip in said mounting casing on said housing and located to be connected to said connection section on said circuit member without manual intervention when said lower end of said tower structure is inserted into an opening of said mounting casing.

6. A digitizing scanning apparatus for scanning and recording an image for ultimate reproduction, said apparatus comprising:
   (a) a base housing member,
   (b) means on said base housing to receive an image to be scanned,
   (c) an upstanding member mounted on said base housing,
   (d) means for causing relative movement between said housing and said upstanding member to enable a scanning action to take place,
   (e) a scanning element mounted on said upstanding member and which scans successive segments of an image on said housing to digitize the image for recording and ultimate reproduction when relative movement exists between said upstanding member and said housing, and
   (f) a source of light also mounted on said upstanding member closely located to an optical path between the scanning element and a segment of the image being scanned to enable an illumination of the image on said housing with substantially even light distribution, said source of light having a length approximately equal to or greater than the dimension of the image transverse to the direction of relative movement and primarily providing generally uniform illumination to each of the successive segments of the image being scanned as these successive segments are scanned.

7. The digitizing scanning apparatus of claim 6 further characterized in that at least one first arm is secured to said upstanding member and extends outwardly therefrom over said base housing and said scanning element is mounted on said first arm.

8. The digitizing scanning apparatus of claim 7 further characterized in that at least one second arm is secured to said upstanding member and extends outwardly therefrom over said base housing and said source of light is mounted on said second arm.

9. The digitizing scanning apparatus of claim 7 further characterized in that a pair of spaced apart second arms extend outwardly from said upstanding member and said first arm is located and spaced between said pair of second arms.

10. The digitizing scanning apparatus of claim 9 further characterized in that said first arm is also spaced upwardly above said pair of second arms.

11. The digitizing scanning apparatus of claim 6 further characterized in that said scanning element is a charged coupled device.

12. A digitizing scanning apparatus for scanning and recording an image for ultimate reproduction, said apparatus comprising:
(a) a base housing,
(b) a mounting casing mounted on said base housing and being mounted for movement with respect thereto along a wall thereof and also having an opening therein,
(c) a tower structure removably mounted in said opening in said mounting casing so that the tower structure is movable with respect to said housing,
(d) means mounted on said tower structure to enable a scanning and digitizing of an image in a form where the digitized image may be recorded and subsequently reproduced,
(e) a circuit member in said tower structure and having a connection section at a lower end thereof, and
(f) a connector strip in said mounting casing and located to be automatically connected to said connection section on said circuit member without manual intervention when said lower end of said tower structure is inserted into said opening of said mounting casing.

13. The digitizing scanning apparatus of claim 12 further characterized in that said circuit member is a circuit board and said connecting section is a circuit connecting strip.

14. The digitizing scanning apparatus of claim 13 further characterized in that said circuit board is mounted for limited vertically shiftable movement in said tower structure.

15. The digitizing scanning apparatus of claim 14 further characterized in that said circuit board will move upwardly in said tower structure as said tower structure is inserted into said opening of said casing until the circuit board is fully connected to said connector strip.

16. The digitizing scanning apparatus of claim 15 further characterized in that said circuit board will move downwardly in said tower structure as said tower structure is moved outwardly of said opening until the circuit board is fully disconnected from said connector strip.

17. The digitizing scanning apparatus of claim 14 further characterized in that a source of light is mounted on said tower structure to illuminate an image on said housing.

18. The digitizing scanning apparatus of claim 17 further characterized in that a scanning element is mounted on said tower structure.

19. A digitizing scanning apparatus for scanning and recording an image for ultimate reproduction, said apparatus comprising:
(a) a base housing having a vertically disposed side wall and an upper platen surface,
(b) a pair of horizontally extending support rails in a portion of said housing and being located inwardly of said side wall,
(c) a pair of openings in said side wall enabling access to said support rails,
(d) a tower structure mounted on said support rails for movement therealong to enable said tower structure to move relative to the platen surface of said housing,
(e) projecting means attached to said tower structure and extending through said openings to engage said support rails and thereby support said tower structure, and
(f) scanning means mounted on said tower structure and permitting a scanning and digitizing of an image on said platen as said tower structure moves during scanning relative to said housing to provide a digitized image which may be recorded and ultimately reproduced.

20. The digitizing scanning apparatus of claim 19 further characterized in that the rails are vertically spaced apart.

21. The digitizing scanning apparatus of claim 19 further characterized in that a vertically disposed plate is provided for mounting said tower structure to said housing, said projecting means comprising at least one arm which extends from said plate inwardly through said openings to engage said rails.

22. The digitizing scanning apparatus of claim 21 further characterized in that bearings are arranged between said at least one arm and said rails to support said plate on said rails.

23. A digitizing scanning apparatus for scanning and recording an image for ultimate reproduction, said apparatus comprising:
(a) a base housing,
(b) a pair of rails comprised of an upper rail and a lower rail mounted to an extension of said base housing,
(c) a carriage plate supported on said pair of rails,
(d) a tower structure carried by said carriage plate and having a vertically disposed section and a member horizontally extending from said vertically disposed section,
(e) a first pair of bearings on said carriage plate located to engage said upper rail on a side thereof,
(f) a second pair of bearings on said mounting plate located to engage another portion of said upper rail on a portion spaced apart from the side which said first pair of bearings engage, (g) said carriage plate only including a single bearing means for engaging said lower rail and which engages the lower rail only on one side thereof, said first and second pair of bearings and said bearing means being arranged to support the horizontally extending member of said tower structure without any binding on said support rails, and (h) means carried by said tower structure to enable scanning and digitizing of an image for recording and subsequent reproduction.

24. The digitizing scanning apparatus of claim 14 further characterized in that said horizontally extending member is disposed over said base housing, said first pair of bearings and said bearing means engaging opposite sides of said rails.

25. The digitizing scanning apparatus of claim 24 further characterized in that said first pair of bearings engage a rearwardly presented side of said upper rail and said bearing means engages a forwardly presented side of said rail.

26. The digitizing scanning apparatus of claim 25 further characterized in that said second pair of bearings engages an upwardly presented surface of said upper rail.

27. The digitizing scanning apparatus of claim 25, further characterized in that said first pair of bearings and third bearing are mounted on arms extending from said plate.

28. The digitizing scanning apparatus of claim 26 further characterized in that said bearings and said bearing means are roller bearings.

29. A digitizing scanning apparatus for scanning and recording an image for ultimate reproduction, said apparatus comprising:
   (a) a base housing,
   (b) an upstanding member operatively mounted on said base housing,
   (c) means for causing relative movement between said base housing and said upstanding member,
   (d) a scanning element operatively mounted on said upstanding member and scanning an image on aid housing when the relative movement exists between said upstanding member and said housing to produce a scanned image to be recorded and subsequently reproduced,
   (e) a source of light for illumination of the image on said housing with uniform light distribution across said image on said housing during the scanning of the image, and
   (f) means for adjusting the relative vertical distance of the optical path which exists between the scanning element and the image to be scanned to thereby change the aspect ratio of the image which is to be reproduced.

30. The digitizing scanning apparatus of claim 30 further characterized in that the means to adjust comprises a zoom lens.

31. The digitizing scanning apparatus of claim 31 further characterized in that the zoom lens is also mounted on said upstanding member and is optically interposed between the scanning element and the image.

32. The digitizing scanning apparatus of claim 31 further characterized in that the source of light is also mounted on the upstanding member.

* * * * *